Oct. 4, 1960 M. BAUMANN 2,954,807
MACHINE FOR THE PRODUCTION OF SMALL PARQUET BATTENS
Filed Feb. 14, 1957 7 Sheets-Sheet 1

INVENTOR.
Manfred Baumann
BY
ATTORNEYS

Oct. 4, 1960  M. BAUMANN  2,954,807
MACHINE FOR THE PRODUCTION OF SMALL PARQUET BATTENS
Filed Feb. 14, 1957  7 Sheets-Sheet 3

INVENTOR.
Manfred Baumann
BY
ATTORNEYS

Oct. 4, 1960 M. BAUMANN 2,954,807
MACHINE FOR THE PRODUCTION OF SMALL PARQUET BATTENS
Filed Feb. 14, 1957 7 Sheets-Sheet 5

INVENTOR.
Manfred Baumann
BY
ATTORNEYS

Oct. 4, 1960   M. BAUMANN   2,954,807
MACHINE FOR THE PRODUCTION OF SMALL PARQUET BATTENS
Filed Feb. 14, 1957   7 Sheets-Sheet 7

INVENTOR.
Manfred Baumann
BY
ATTORNEYS

United States Patent Office 2,954,807
Patented Oct. 4, 1960

2,954,807

MACHINE FOR THE PRODUCTION OF SMALL PARQUET BATTENS

Manfred Baumann, Wittestrasse, St. Margrethen, Switzerland

Filed Feb. 14, 1957, Ser. No. 640,226

Claims priority, application Switzerland Sept. 12, 1952

6 Claims. (Cl. 143—58)

This invention relates to a machine for the manufacture of small parquet battens.

The present application is a continuation-in-part of my co-pending patent application, Serial No. 372,279, filed August 4, 1953, now abandoned.

An object of the present invention is the provision of a machine of a semi-automatic type which is comparatively inexpensive in production, which occupies a small amount of space and which will operate most efficiently in the manufacture of paraquet battens of small size.

Another object of the present invention is the provision of a machine of the described type which is provided with a novel and most effective device for holding boards used for the manufacture of parquet battens.

Another object is the provision of a swingable arm used for holding a board and so constructed that the clamping and releasing of the board is carried out automatically, depending upon the position of the swingable arm.

Yet another object is the provision of a board clamping device which is so constructed that it can clamp easily and effectively boards of varying thicknesses.

Still another object is the provision of a swingable clamping arm which is so constructed that it can be easily adjusted as far as its length is concerned so as to compensate for the differences in diameters of the saws cutting the boards.

Other objects of the present invention will become apparent in the course of the following specification.

The objects of the present invention may be realized through the provision of a machine having a single shaft carrying cross-cut saws, a planer knife cylinder and rip-saws, which are all arranged upon said shaft one beside the other in parallel working direction. A second planer knife cylinder is located adjacent the first-mentioned planer knife cylinder. The machine further comprises movable feed members which convey the workpieces to the cutting elements mounted upon the shaft. At least one of these feeding elements consists of a swingable arm provided with means for holding a board which is to be cut into parquet battens. The arm is swingable by means of a hand grip, and it is used to feed the board to the pair of cross-cut saws. The arm cooperates with clamping elements which clamp and release the board, depending upon the position of the arm. Furthermore, the operative length of the arm can be conveniently adjusted so as to compensate for the differences in the diameters of the cross-cut saws.

The invention will appear more clearly from the following detailed description when taken in conjunction with the accompanying drawings, showing by way of example a preferred embodiment of the inventive idea.

In the drawing:

Figure 3 is a section along the line III—III of Figure 1.

Figure 1:
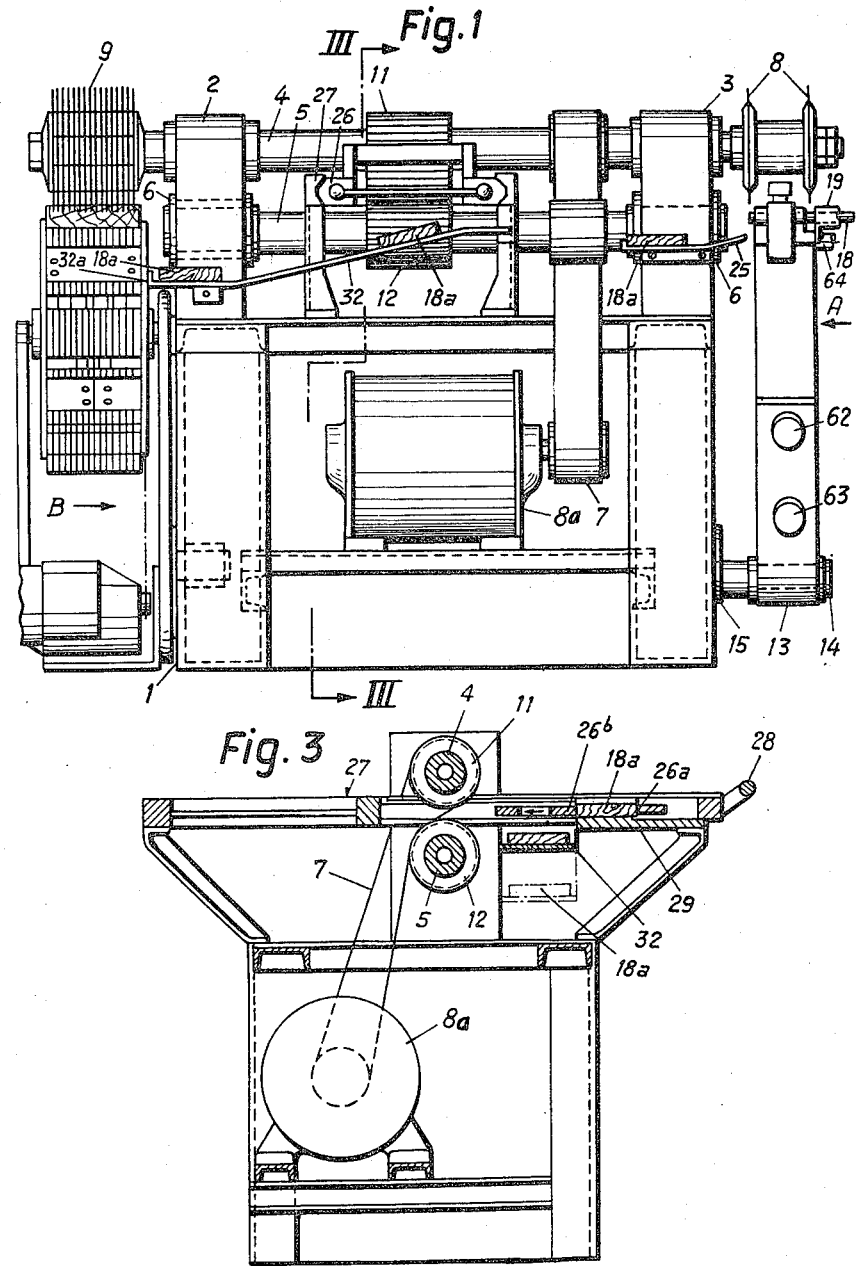
Figure 1 is a front view of the machine constructed in accordance with the principles of the present invention.
Figure 2:
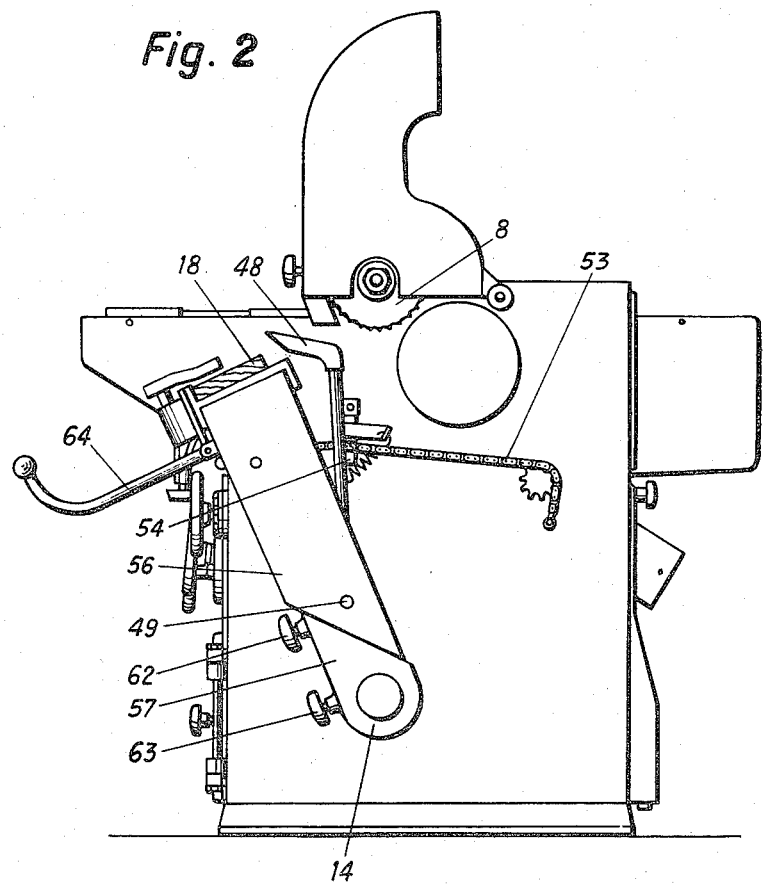
Figure 2 is a side view of the machine shown in Figure 1, looking in the direction of the arrow A, and illustrates the feeding mechanism.
Figure 4:
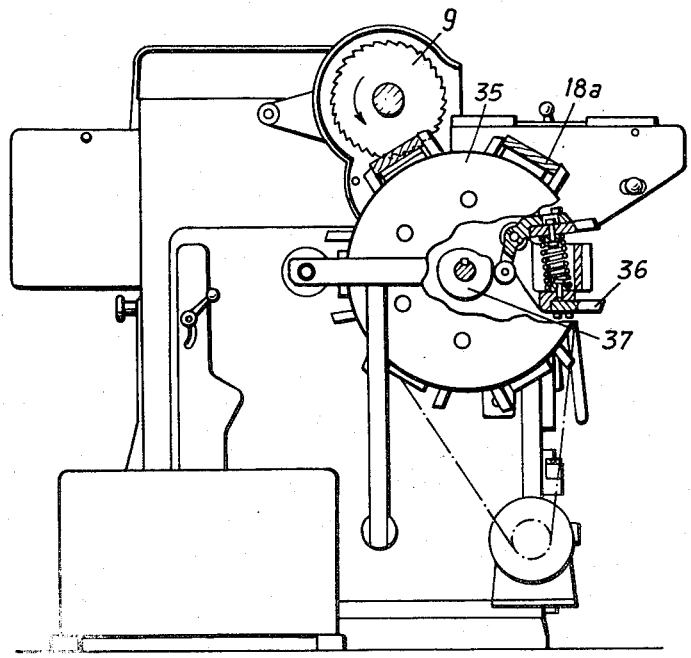
Figure 4 is another side view of the machine, looking in the direction of the arrow B of Fig. 1, and illustrates a rotary drum.
Figure 5:
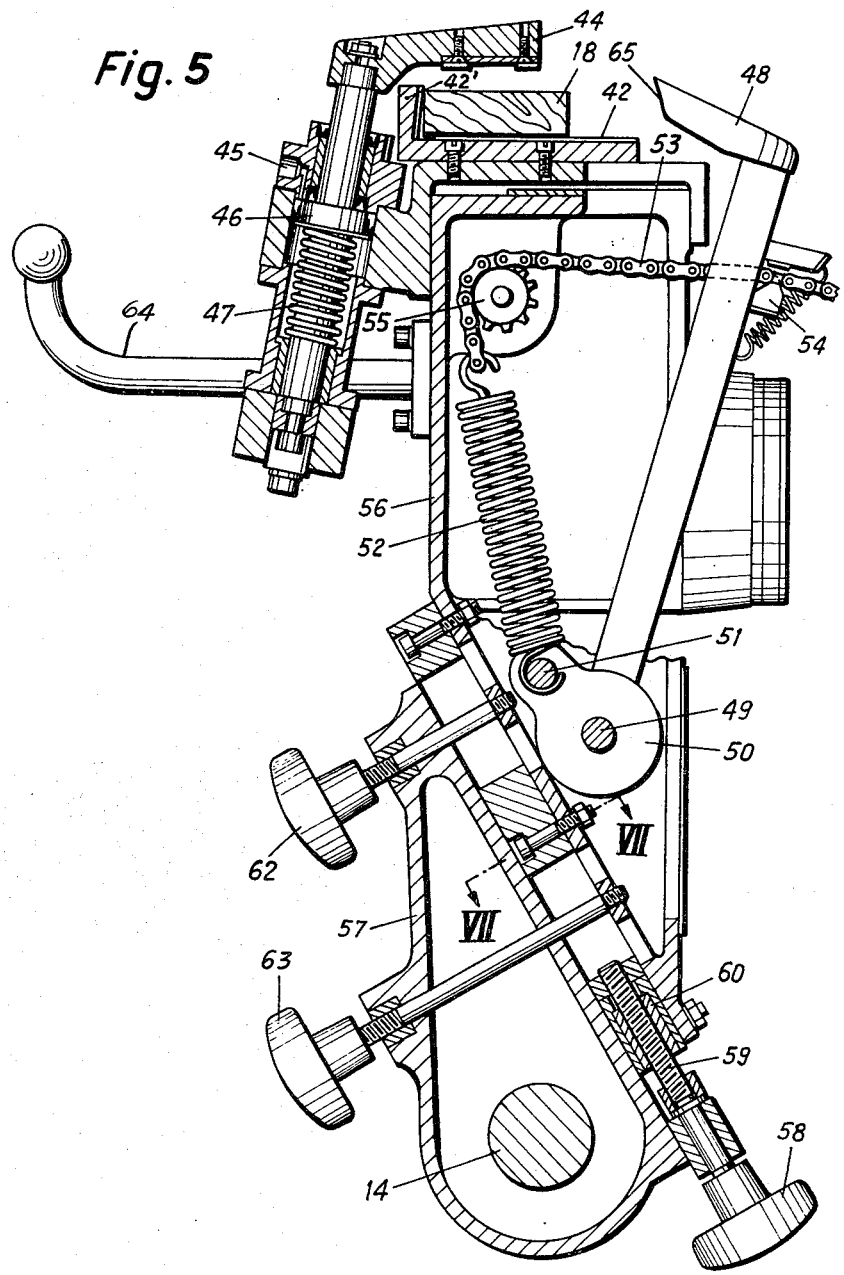
Figure 5 is partly a sectional view and partly a front view, showing in greater detail the feed mechanism illustrated in Figure 2.
Figure 6:
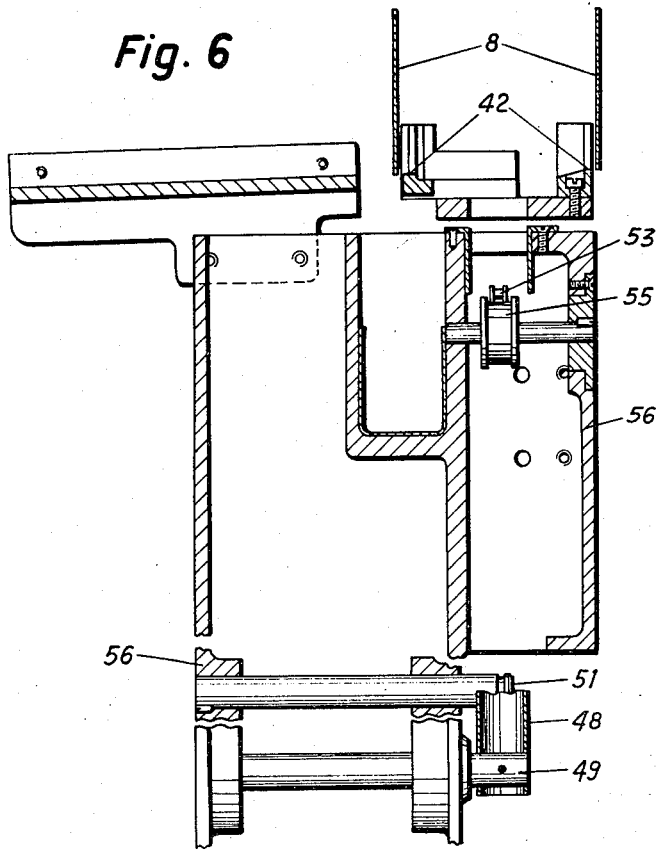
Figure 6 illustrates in section a detail of the construction shown in Fig. 5.
Figure 7:
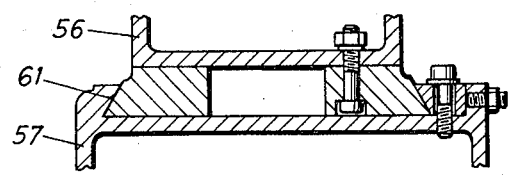
Figure 7 is a section along the line VII—VII of Fig. 5.

The machine shown in Fig. 1 includes a frame 1, having two bearing blocks 2 and 3 which support a shaft 4. The shaft 4 carries two spaced cross-cut saws 8 at one end. The other end of the shaft 4 carries a set of rip-saws 9. Between the saws 8 and 9 and approximately in the middle of the shaft 4, a planer knife cylinder 11 is firmly mounted upon the shaft. A shaft 5 carries a planer knife cylinder 12 located below the planer knife cylinder 11 and cooperating therewith. The shaft 5 is mounted in the frame 1 upon eccentric bearings 6 so that the distance of the shaft 5 from the shaft 4 may be conveniently adjusted. A motor 8a is used to drive the shafts 4 and 5 by means of a belt-transmission 7.

It is thus apparent that the three machining tools, namely, the cross-cut saws 8, the planer knife cylinders 11 and 12, and the rip saws 9 are all arranged side by side in a parallel working direction.

Various feeding devices are arranged for movement transversely to the shaft 4 so as to guide the workpieces 18 toward the saws.

The apparatus for feeding the boards 18 is shown in greater detail in Figs. 2, and 5 to 9 of the drawings. Each of the boards 18 is carried upon a supporting angle 42, best shown in Fig. 5, and is clamped thereon by a clamping iron 44. The clamping iron 44 is connected with a piston 46 which is actuated by compressed air, as will be described in greater detail hereinafter. The compressed air is introduced through a valve 45 and can press downwardly the piston 46 along with the clamping arm 44 connected therewith, thereby compressing the spring 47.

Another clamping rod 48 is adapted to clamp a piece of wood 18 from the opposite side. The clamping rod 48 is connected with a flange 50 rotatably mounted upon a shaft 49 which is carried by the casing 1. The flange 50 has an extension carrying a pin 51, to which one end of a spring 52 is attached. The other end of the spring 52 is connected with one end of a chain 53 which is guided over a roller 55 and which is connected with the rod 48. This portion of the length of the chain 53 may be varied at will by means of the stop 54 carried by the chain 53 and contacting the arm 48. It is apparent that the stop 54 may be suspended from any one of several lengths of the chain.

The clamping members 44 and 48 are so dimensioned and mounted that they can move conveniently under the shaft 4 carrying the saws 8 without touching the shaft or the saws.

The swinging arm carrying the support 42 consists of two parts, namely, an upper portion 56 and a lower portion 57. The portions 56 and 57 engage each other along inclined guides 61, best shown in Fig. 7. Due to this arrangement, the relative positions of the arm portions 56 and 57 may be varied at will and thus the operative length of the arm 56, 57 may be varied. This makes it possible to compensate for the deterioration of the operative diameter of the rotary saws 8 caused by extensive use.

The adjustment takes place by means of a hand wheel 58 carried by the lower arm portion 57 and connected with a threaded spindle 59. The spindle 59 meshes with the inner threads of a sleeve 60 which is firmly connected with the upper arm portion 56. Thus, by turning the handle 58, the arm portions 56 and 57 will move relatively to each other on the guides 61 shown in Fig. 7. Hand wheels 62 and 63 are provided with pins and are used to hold the arm members 56 and 57 in their adjusted positions.

Figure 10:
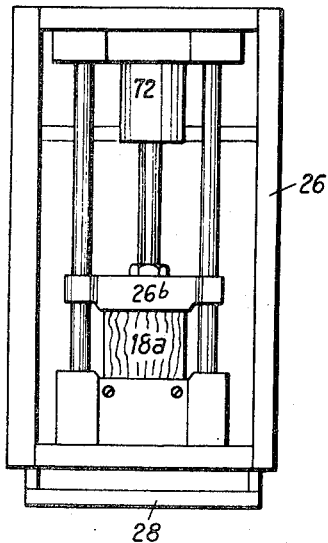
Figure 10 is a top view of the work holding slide.

A second feeding device includes a table 25 which is mounted on a bearing block 3 and which is located between the cross-cut saws 8 and the planer knife cylinders 11 and 12. The board is supplied to the planer knife cylinders 11 and 12 by means of a slide 26, which is movable in guides 27. The slide 26 is provided with a handle 28, so that it can be moved manually backwards and forwards. The slide 26 has an opening 26a adapted to receive the sawed-off small board 18a. A clamping bar 26b is used to hold the board 18a within the opening 26a. A cylinder 72 with a piston which is actuated by compressed air and which actuates the bar 26b, is carried by the slide 26 (Fig. 10). The clamping bar 26b is narrower than the distance between the planer knife cylinders 11 and 12, so that it does not interfere with the movement of the slide 26 between the two cylinders.

An inclined delivery table 32 extends between the planer knife cylinders 11 and 12 and the rip-saws 9. That end of the inclined table 32 which is located close to the rip-saws 9 is provided with a plate 32a.

As shown in the drawings, the board 18a leaving the plate 32a is fed to the rip saws 9 by means of a rotary drum 35 provided with a clamping device 36. The board 18a is ripped into finished small parquet floor battens by the set of rip saws 9. During the downward movement of the drum 35 the clamping device 36 is released by the device 37, thereby releasing the battens which are then removed for further use.

The operation of the machine is as follows:

The operator who stands in front of the rocker arms 56, 57 places a board 18, which is to be cut, upon the support 42. After each cut the board is newly tightened, so that even very bent boards can be handled on this machine. The operator holding the handle 64 swings the arm 56, 57 about the shaft 14 moving it clockwise (looking in the direction of Figs. 8 and 9) toward the saws 8. Due to this swinging movement the distance between the roller 55 and the opposite end of the chain 53 is diminished so that the spring 52 is contracted. In the course of the further swinging of the arms 56, 57, the front end 65 of the clamping lever 48 will engage the board 18 and will press the board against the support 42.

Figure 8:
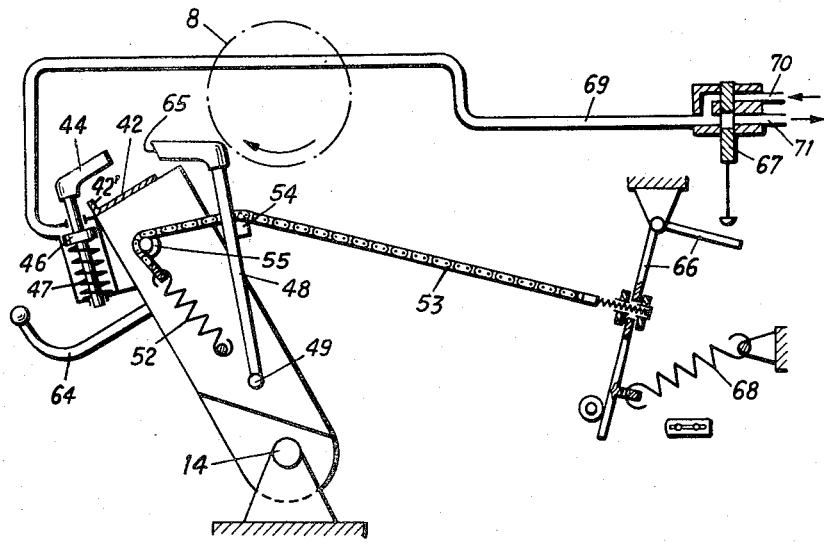
Figure 8 is a diagrammatic side view of the device shown in Fig. 2 and its connections to its actuating means.
Figure 9:
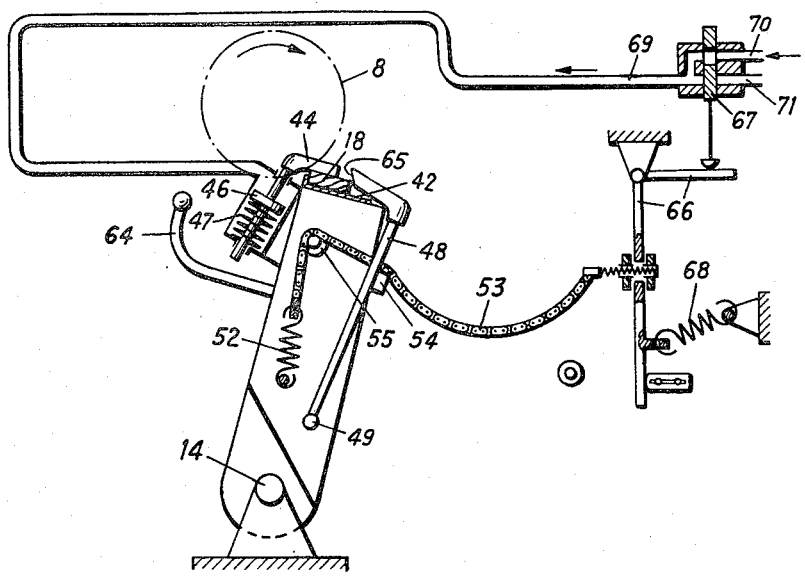
Figure 9 is similar to Fig. 8 and shows the device in a different position.

As shown in Figures 8 and 9, the opposite end of the chain 53 is firmly connected with an angular lever 66 which is pivotally mounted upon the machine frame. The other end of the lever 66 may engage a valve 67 for compressed air. The lever 66 is held in position by a spring 68.

It is apparent that during the above described swinging movement of the arms 56, 57, the force of the spring 52 will become less than that of the spring 68, and then the lever 66 will be actuated and by continuing the swinging movement the valve 67 will open.

The valve 67 may be connected with one of the conduits 70 and 71 for the admission or withdrawal of compressed air. The valve 67 is connected by a conduit 69 with the valve 45 (Fig. 5), which supplies compressed air to the piston 46.

Thus, when compressed air reaches the piston 46, it will press the piston 46 downwardly along with the clamping lever 44, so that the board 18 will be clamped by the member 44.

The order of operation is so set that first the front end 65 of the clamping lever presses the board 18 against the stop 42' and afterwards the clamping member 44 presses the board against the support 42.

In the course of the further movement of the arms 56, 57 in the same direction, the board 18 is brought into engagement with the cross-cut saws 8, which will cut the board.

After the board has been cut, the operator holding the handle 64 swings the arms 56, 57 counterclockwise from the position shown in Fig. 9 back to the position shown in Fig. 8. In the course of this movement, the chain 53 will be stretched and will move the arm 48 away from the board 18, thereby releasing one side of the board. At that time, the valve 67 will be moved to the position shown in Fig. 8, wherein the compressed air conduit 69 is connected with the outflow conduit 71, while the conduit 70 is closed by the valve 67. Then, compressed air will be removed from the conduit 69 and the spring 47 will move the clamp 44 back to its inoperative position shown in Fig. 8.

The operator will then remove the cut plank 18a and place a new piece of wood 18 upon the support 42.

The cut plank 18a will be placed upon the table 25 and will be inserted by a second operator into the opening 26a of the slide 26 which is located upon the feed table 29.

The board 18a is clamped at the correct height and is conveyed by the second operator backwards and forwards between the planer knife cylinders 11 and 12 which plane the board to the precise thickness.

Upon the return stroke of the slide 26, the operator releases the clamping bar 26b so that the board 18a, now planed, falls upon the inclined surface of the delivery table 32 and comes to rest upon the plate 32a.

Thereupon, a third operator takes the board 18a and places it upon the rotary drum 35, clamping it by means of the device 36. The board 18a is now cut by the rip saws 9 into small parquet battens. Another operator located on the opposite side of the machine removes the finished parquet battens and places them upon any suitable conveyor, not shown in the drawing.

An advantage of the described machine is that in the course of its semi-automatic operation, the workpiece is moved through the paths of operation which extend parallel to each other and perpendicularly to the single shaft carrying the cutting elements.

The machine occupies little space and is most inexpensive in manufacture and operation.

Figure 11:
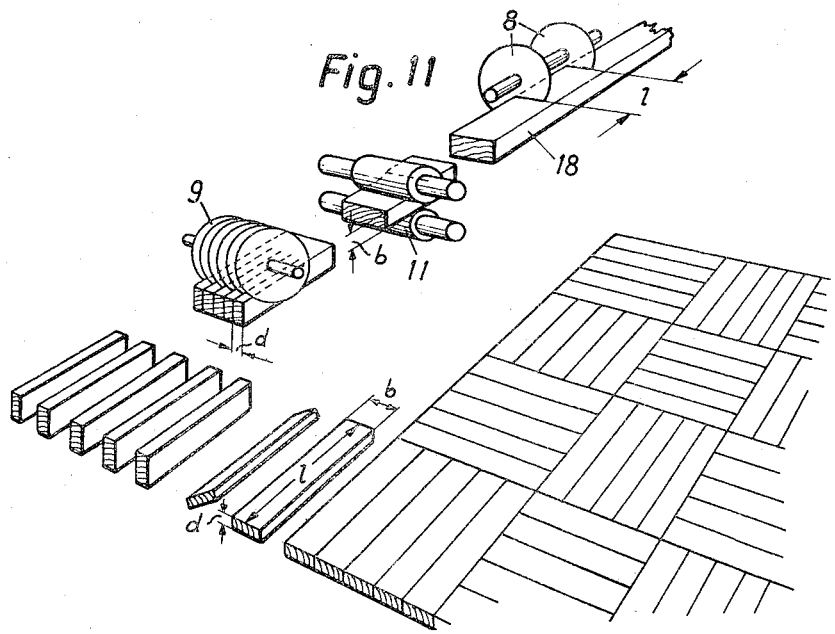
Figure 11 is a diagrammatic view of the working principle of the machine.

The parquet battens manufactured by the described machine are laid together to form a square (Fig. 11). These squares are placed crosswise to one another. The board is first cut by the cross-cut saw 8, that is blocks are cut out of length $l$, which correspond to the finished length of the slats. These blocks are then milled to the exact thickness $b$ by the two planer knives which work together and the board is finally ripped so that individual battens of thickness $d$ are obtained.

It is apparent that the example shown above has been given solely by way of illustration and not by way of limitation and that it is subject to many variations and modifications within the scope of the present invention. All such variations and modifications are to be included within the scope of the present invention.

What is claimed is:

1. In a machine for the production of small parquet battens, a board feeding device comprising a swingable arm having an outer end and a pivoted end, means for varying the operative length of said swingable arm, a board support carried by said outer end, an oscillatory clamping arm having a board clamping end and a pivoted end located between said board support and said pivoted end of the swingable arm, an elongated connecting member having a first end and a second end, a tension spring connected with said swingable arm and the second end of said member, means connecting said member intermediate its ends with said clamping arm, the tension of the spring being relieved during the swinging of said swingable arm towards said clamping arm, thereby causing said spring to draw said arms together and causing said clamping arm to clamp a board upon said board support, a board holder carried by said outer end of the swinging arm and located substantially opposite said clamping arm to clamp said board, a piston connected with said board holder for actuating said board holder, fluid conveying means for actuating said piston, a valve connected with said fluid conveying means, and valve actuating means connected with said first end of said member for actuating said piston to cause said board holder to clamp said board during said swinging of the swingable arm.

2. In a machine for the production of small parquet battens, a device for feeding boards to a pair of spaced cross-cut saws, said device comprising a swingable arm having an outer end and a pivoted end and swingable toward and away from said saws, a board support carried by said outer end and narrower than the distance between said saws, positioning means carried by said support, an oscillatory clamping arm having a board clamping end adapted to press a board against said positioning means and a pivoted end located between said board support and said pivoted end of the swingable arm, an elongated connecting member having a first end and a second end, a tension spring connected with said swingable arm and the first end of said member, said member being connected intermediate its ends with said clamping arm, the tension of the spring being relieved during the swinging of said swingable arm towards said clamping arm, thereby causing said spring to draw said arms together and causing said clamping arm to clamp a board upon said board support, a board holder carried by said outer end of the swinging arm and located substantially opposite said clamping arm to clamp said board, a piston connected with said board holder for actuating said board holder, fluid conveying means for actuating said piston, a valve connected with said fluid conveying means, and valve actuating means connected with said first end of said member for actuating said piston to cause said board holder to clamp said board during said swinging of the swingable arm.

3. A device in accordance with claim 1, wherein said elongated connecting member consists of a chain.

4. A device in accordance with claim 1, wherein said fluid conveying means consist of means conveying compressed air.

5. In a machine for the production of small parquet battens, a board feeding swingable arm having an upper portion and a lower portion having interengaging inclined edges for varying the operative length of said swingable arm, said upper portion of the swingable arm having an outer end, said lower portion of the swingable arm having a pivoted end, a board support carried by said outer end, an oscillatory clamping arm having a board clamping end and a pivoted end located between said board support and said pivoted end of the swingable arm, an elongated connecting member having a first end and a second end, a first tension spring connected with said swingable arm and the second end of said member, said member being adjustably connected intermediate its ends with said clamping arm, the tension of the spring being relieved during the swinging of said swingable arm towards said clamping arm, thereby causing said spring to draw said arms together and causing said clamping arm to clamp a board upon said board support, a board holder carried by said outer end of the swinging arm and located substantially opposite said clamping arm to clamp said board, a cylinder carried by said swingable arm, a piston slidably mounted in said cylinder and connected with said board holder for actuation thereof, fluid conveying means connected to said cylinder, a valve located in the path of the fluid in said conveying means, valve actuating means, means connecting the second end of said connecting member with said valve actuating means and a second spring engaging said valve actuating means to maintain said valve in an opened position.

6. A machine for the production of small parquet battens from a board having a top surface and opposed upper edges, said machine comprising a pair of rotatable spaced cross-cut saws, a board support movable relatively to said saws, two opposed clamping members mounted upon said board support, one of said clamping members being adapted to engage said top surface of the board for clamping the board upon said board support, the other one of said clamping members being adapted to engage one of said upper edges of the board for clamping the board upon said board support, said clamping members being arranged between said cross-cut saws, separate actuating means for moving each of said clamping members between an operative and an inoperative position, said clamping members being movable in different directions, and control means causing firstly the engagement of said board by said other clamping member and thereupon the engagement of said board by said one clamping member responsive to a movement of said board support.

References Cited in the file of this patent

UNITED STATES PATENTS

| | | |
|---|---|---|
| 238,875 | Fay | Mar. 15, 1881 |
| 328,794 | Lhote | Oct. 20, 1885 |
| 568,671 | Fowley | Sept. 29, 1896 |
| 726,968 | Morin | May 5, 1903 |
| 933,965 | Endres | Sept. 14, 1909 |
| 963,063 | Pickett | July 5, 1910 |
| 1,012,885 | McLaughlin et al. | Dec. 26, 1911 |
| 1,401,363 | Richard | Dec. 27, 1921 |
| 1,621,999 | Pierce | Mar. 22, 1927 |
| 2,109,061 | Dietrich | Feb. 22, 1938 |
| 2,260,662 | Farrell | Oct. 28, 1941 |
| 2,559,258 | Olson | July 3, 1951 |
| 2,559,378 | Stalder | July 3, 1951 |
| 2,582,658 | Tackett | Jan. 15, 1952 |

FOREIGN PATENTS

| | | |
|---|---|---|
| 585,659 | France | Dec. 12, 1924 |